Patented Apr. 25, 1944

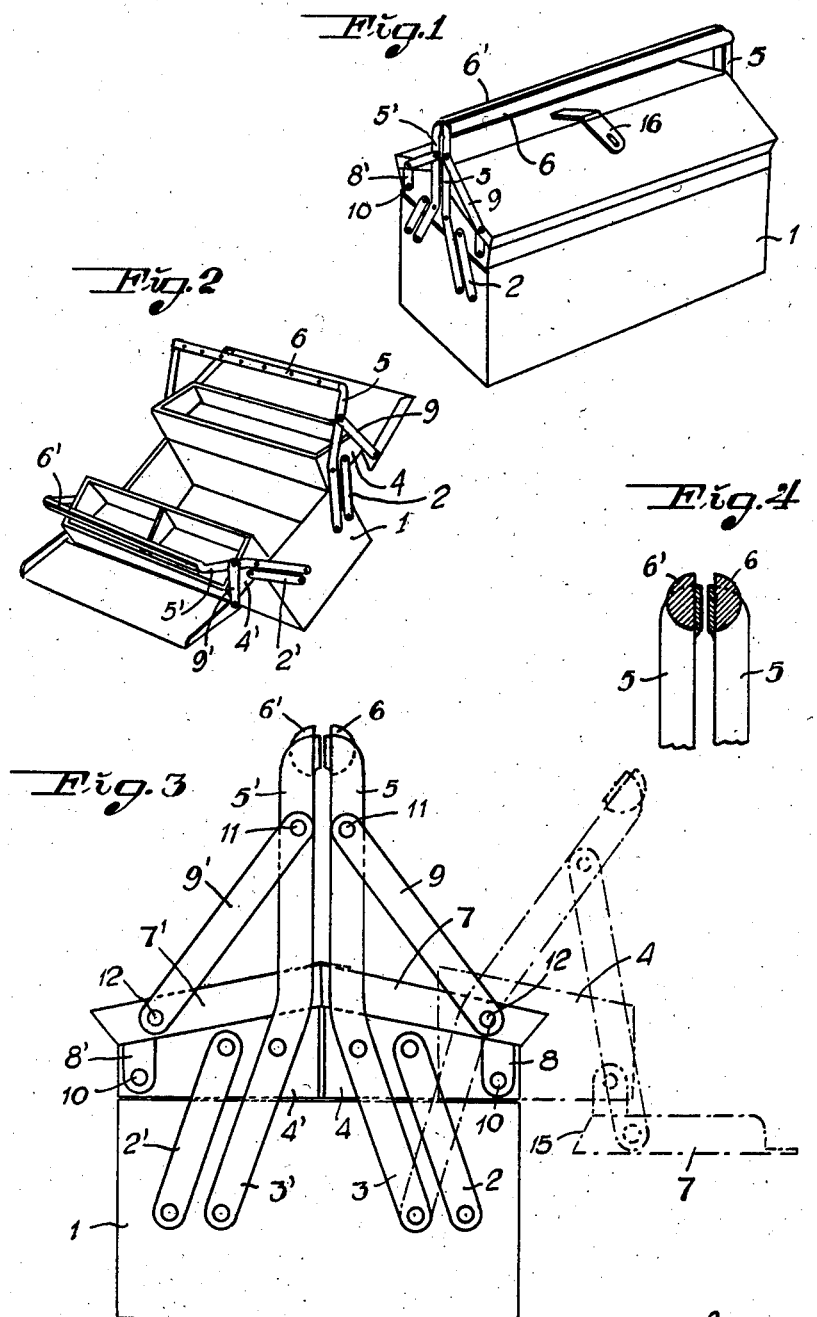

2,347,270

UNITED STATES PATENT OFFICE 2,347,270

TOOLBOX

Eric Larsson, Malung, Sweden

Application April 1, 1942, Serial No. 437,297
In Sweden July 2, 1941

1 Claim. (Cl. 206—16)

This invention relates to a portable box for tools and similar implements of the type provided, above the container space proper, with two receptacles which are laterally slidable in opposite directions by means of a parallel-link mechanism and which in their inner positions, in which they cover the container space proper, are adapted to be closed by a laterally swingable two-part lid arranged to cover the entire box. The invention has for its object to provide a box of the kind referred to wherein the main container and the receptacles can be opened and closed in a very simple manner by a single movement.

I attain this object by mechanism illustrated in the accompanying drawing, in which:

Fig. 1 is a view in perspective of the tool box in closed position; Fig. 2 is a similar view of the tool box in opened position; Fig. 3 is an end view of the box in an enlarged scale; and Fig. 4 is a vertical section of the handle of the box.

Similar numerals refer to similar parts throughout the several views.

The tool box which advantageously entirely consists of hard sheet metal includes a lower portion 1 which constitutes the main container. Parallel-link mechanisms 2, 3 and 2', 3' pivotally secured to the end walls of the container 1 are further pivotally connected with two receptacles 4, 4' disposed above the main container. The said receptacles are arranged to be moved by means of the parallel-link mechanisms from an inner position (Fig. 1) in which they cover the container 1 into an outward position in which they are disposed laterally of the container, and vice versa.

The inner links 3, 3' of the link mechanism are elongated upwardly, the elongated portions 5, 5' constituting the vertical parts of a longitudinally divided handle 6, 6'.

Pivoted to the receptacles 4, 4' are lids 7 and 7', respectively, the pivots 10 of which are secured to the receptacles and extend through lugs 8, 8' connected to the lids. Rods 9, 9' are linked by means of pivots 11 to the vertical handle portions 5, 5' and are secured to the lids 7 and 7', respectively, by means of pivots 12. The said pivots 12 are advantageously disposed above and inwardly of the lid pivots 10 (see Fig. 3).

To open the tool box, the handle portions 5, 6 and 5', 6' are swung laterally outwards from the position shown in Fig. 1. Thereby, the receptacles 4, 4' will be moved outwardly by the parallel-link mechanism. By means of the links 9, 9', the lids 7, 7' will simultaneously be swung upwardly and outwardly. Finally, the various parts will be brought into the positions shown in Fig. 2 and by dash and dot lines in Fig. 3, in which positions both the main container 1 and the receptacles 4 and 4' are entirely uncovered. When the handle portions are laterally swung out, they will not prevent free access to the various parts of the box. The lids too, which near their pivots are provided with substantially vertical walls 15, are swung out to a substantially horizontal position and may be used as supports for tools or other articles. The box can be closed in a simple manner by swinging together the handle portions. The lids are provided with flaps 16 for locking the box in closed position.

The handle portions 5, 5' need not be constituted by elongations of the links 3, 3' of the link mechanism but may be pivotally mounted on the container 1 and linked to the link mechanism by means of connecting rods.

What I claim is:

A tool box comprising a main container having side and bottom walls and open upwardly, two auxiliary receptacles each having side and bottom walls and open upwardly mounted on and above said main container by parallel link mechanism, said receptacles being movable laterally with respect to said container on said link mechanism to cover and uncover said container, lid members hinged to said receptacles to cover and uncover the same, a fixed point on an integral part of each lid member being pivoted to a fixed point of an integral part of its respective receptacle, said parallel link mechanism including handle members pivoted at fixed points to said container and to said receptacles for moving said receptacles laterally with respect to said container, and link members connecting said handle members and said lid members and operative to swing the lid members to open position as the receptacles are moved to open position whereby as said handle members are actuated to move said receptacles laterally to open position with respect to said container said lid members will execute arcuate swinging movements about their fixed pivot points on said receptacles from substantially horizontal closed positions over said receptacles to substantially horizontal inverted position extending laterally of said receptacles.

ERIC LARSSON.